United States Patent
Haleem et al.

(10) Patent No.: US 8,335,495 B1
(45) Date of Patent: Dec. 18, 2012

(54) DISPLAYING BUSINESS DIRECTORY INFORMATION ON A MOBILE HANDSET

(75) Inventors: Ambreen Haleem, Overland Park, KS (US); Ryan A. Wick, Apollo Beach, FL (US); Raymond E. Reeves, Olathe, KS (US); Nathan A. Smith, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 711 days.

(21) Appl. No.: 12/412,813

(22) Filed: Mar. 27, 2009

(51) Int. Cl.
*H04M 3/493* (2006.01)
*H04M 3/42* (2006.01)
*H04W 24/00* (2009.01)
*G06F 15/16* (2006.01)

(52) U.S. Cl. ............ 455/414.2; 455/456.3; 379/218.01; 709/228

(58) Field of Classification Search .................. 455/403, 455/414.1–414.4, 41, 406, 416, 422.1, 456, 455/456.1–456.3, 461, 466, 550, 557, 564, 455/569.1–569.2, 575.1, 575.9; 379/142.13, 379/67.1, 142.15, 201.03, 221.02, 265.01, 379/265.09, 265.12, 266.04, 266.07, 88.13, 379/900, 93.12
See application file for complete search history.

(56) References Cited

U.S. PATENT DOCUMENTS

| | | | |
|---|---|---|---|
| 6,049,796 A * | 4/2000 | Siitonen et al. ............... 707/711 |
| 6,223,055 B1 * | 4/2001 | Cyr .............................. 455/555 |
| 6,442,242 B1 * | 8/2002 | McAllister et al. .......... 379/67.1 |
| 6,807,257 B1 * | 10/2004 | Kurganov ................... 379/88.22 |
| 6,888,930 B1 * | 5/2005 | Hartselle et al. ........... 379/88.22 |
| 7,031,695 B2 * | 4/2006 | Aono et al. .................... 455/411 |
| 7,200,413 B2 * | 4/2007 | Montemer et al. ............. 455/466 |
| 7,286,653 B2 * | 10/2007 | Hartselle et al. ............. 379/88.23 |
| 7,359,491 B2 * | 4/2008 | Liu et al. .......................... 379/68 |
| 7,480,723 B2 | 1/2009 | Grabelsky et al. |
| 7,546,254 B2 * | 6/2009 | Bednarek ..................... 705/26.1 |
| 7,620,161 B2 * | 11/2009 | Liu et al. ..................... 379/88.25 |
| 7,715,857 B2 * | 5/2010 | Montemer et al. ............. 455/466 |
| 7,720,436 B2 * | 5/2010 | Hamynen et al. ............. 455/13.1 |
| 7,724,878 B2 * | 5/2010 | Timmins et al. ............ 379/88.12 |
| 2002/0031207 A1 * | 3/2002 | Lin ............................. 379/88.17 |
| 2002/0068585 A1 * | 6/2002 | Chan et al. .................... 455/456 |
| 2002/0087408 A1 * | 7/2002 | Burnett .......................... 705/14 |
| 2004/0204958 A1 * | 10/2004 | Perkins et al. .................. 705/1 |
| 2005/0043017 A1 * | 2/2005 | Esposito et al. ............. 455/414.1 |
| 2005/0044061 A1 * | 2/2005 | Klemow .......................... 707/1 |
| 2005/0054333 A1 * | 3/2005 | Johnson ..................... 455/414.3 |
| 2005/0141042 A1 * | 6/2005 | Kawasaki et al. ............. 358/402 |
| 2005/0159137 A1 * | 7/2005 | Ramirez et al. ............ 455/414.1 |
| 2006/0291492 A1 * | 12/2006 | Nugara ......................... 370/401 |
| 2008/0020729 A1 * | 1/2008 | Bernal et al. .................. 455/406 |
| 2008/0233924 A1 * | 9/2008 | Baird et al. ................. 455/414.1 |
| 2010/0248702 A1 * | 9/2010 | Montemer et al. .......... 455/414.3 |
| 2010/0291907 A1 * | 11/2010 | MacNaughtan et al. ... 455/414.1 |

* cited by examiner

*Primary Examiner* — Dwayne Bost
*Assistant Examiner* — Scott Trandai

(57) ABSTRACT

The graphical display capability and the digital data communication capability of wireless mobile handsets are used to present a customized directory of a called enterprise on the display screen of the mobile handset to allow the caller to identify their desired call destination by name. A directory database stores directory information for each call destination of the enterprise. An incoming call to an enterprise IVR unit causes a directory manager to generate a request for user data which is forwarded to the mobile handset via a gateway. The mobile handset opens a data connection and forwards the user data to the directory manager. The directory manager evaluates at least one access rule in response to the user data to select relevant directory information from the directory database, and the directory manager forwards the relevant directory information to the mobile handset for display. Then the user of the mobile handset selects a call destination based on the displayed directory information.

21 Claims, 5 Drawing Sheets

| Names in Directory | Extension | Scope | Filter |
|---|---|---|---|
| Tom | 2006 | Public | |
| Harry | 2008 | Restricted | Location = x |
| Jill | 1459 | Hidden | Caller = y,z |
| ⋮ | ⋮ | ⋮ | ⋮ |

DISPLAYING BUSINESS DIRECTORY INFORMATION ON A MOBILE HANDSET

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to telephone interfacing between an incoming caller and an automated response system for an enterprise such as a business, institutional, governmental or other enterprise organization, and, more specifically, to pushing an organizational directory to a mobile handset of a caller to facilitate selection of a desired call destination.

A typical business or other organizational enterprise (e.g., a governmental or educational entity) may have many members or employees of the organization who are reachable by respective telephone extensions. An enterprise system may use a public branch exchange (PBX) that includes a main telephone number associated with a central system wherein the central system interacts with callers and redirects calls to appropriate destinations within the PBX. The interface function is typically automated using an interactive voice response (IVR) unit that plays audio prompts and collects responses from the caller. The prompts typically follow a menu structure that is navigated by the caller by speaking various commands or by pressing keypad buttons on the telephone device to produce the commands as DTMF tones.

A typical person has an easier time remembering the name of a person they want to call rather than an extension number of that person. Systems are known wherein an IVR menu provides access to the names of people available at an enterprise, such as by entering the first few letters of their name using the keypad and then providing prompts to confirm the selection. However, such systems can be cumbersome and are not helpful when the caller can remember neither the person's name nor their extension number. Furthermore, prior systems have not been adaptable to take into account the actual availability of the callee or to provide the call recipients with any control over which callers can gain access to their extensions. Thus, it would be desirable to provide an improved directory system for providing contact information when a caller calls into a business or other enterprise exchange.

SUMMARY OF THE INVENTION

The present invention uses the graphical display capability and the digital data communication capability of wireless mobile handsets to present a customized directory of a called enterprise on the display screen of the mobile handset to allow the caller to identify their desired call destination by name.

In one aspect of the invention, a system is provided for displaying directory information on a mobile handset of a user. A carrier network carries telecommunication calls to and from the mobile handset. An enterprise unit is coupled to the carrier network and serving an enterprise having a plurality of call destinations. A directory database stores directory information for each call destination including a respective destination identifier and a respective access rule. A directory manager is coupled to the directory database and the enterprise unit, wherein the directory manager generates a request for user data in response to a call from the mobile handset to the enterprise unit. The carrier network includes a gateway for forwarding the request from the directory manager to the mobile handset. The mobile handset forwards the user data to the directory manager. The directory manager evaluates at least one access rule in response to the user data to select relevant directory information from the directory database, and the directory manager forwards the relevant directory information to the mobile handset for display. Then the user of the mobile handset selects a call destination based on the displayed directory information.

DETAILED DESCRIPTION OF PREFERRED EMBODIMENTS

When the user of a wireless mobile handset (such as a CDMA phone) calls a business or other enterprise wherein calls to a main exchange are distributed to a plurality of call destinations within the enterprise, the present invention temporarily makes available a directory of relevant call destinations of the business on the wireless handset. Instead of being prompted to dial the extension of the person to whom the caller wishes to speak, she can open the provided contact list and select the name of the person or the department desired. The invention further allows the business or the identified persons within the business to control the circumstances under which particular call destinations will be included in the directory supplied to the caller based on such factors as the phone number of the caller and the location of the caller.

Figures 1, 2:
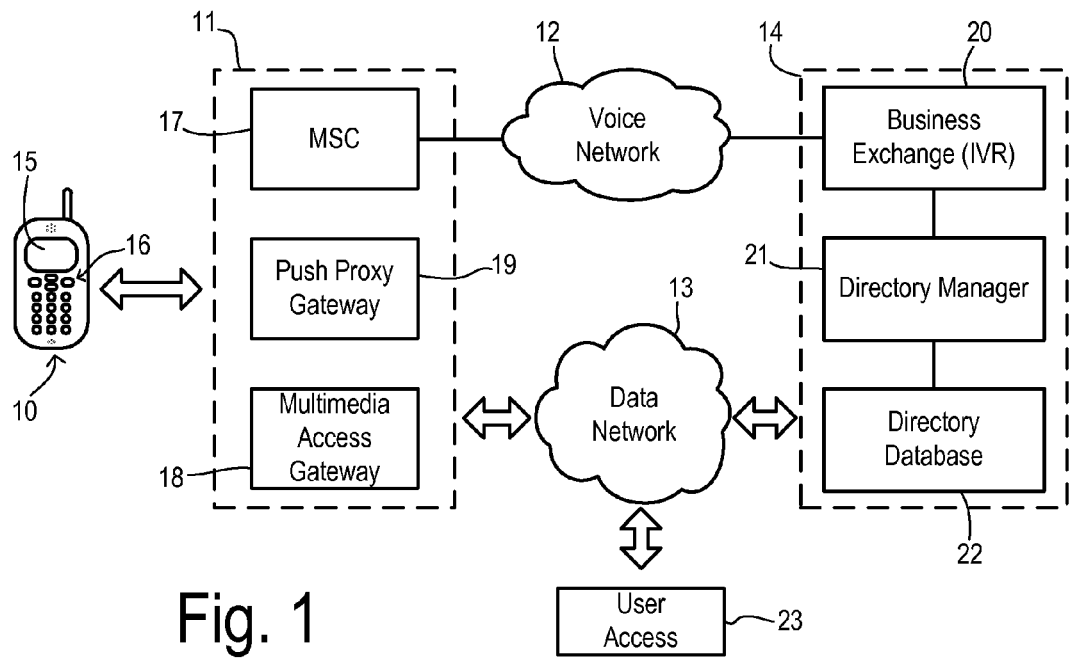
FIG. 1 is a block diagram showing one representative embodiment of the present invention.
FIG. 2 is a data table showing an example of a directory database.

Referring now to FIG. 1, a mobile handset 10 is wirelessly coupled to a carrier network 11, such as a CDMA-based network. A voice network 12 (such as a public switched telephone network) connects carrier network 11 to an enterprise system 14. Enterprise system 14 is further coupled to carrier network 11 by a data network 13 (such as the Internet). Mobile handset 10 can send and receive both voice and data signals. It includes a graphical display 15 and a keypad 16.

Carrier network 11 includes a mobile switching center 17 to establish voice calls from mobile handset 10 through voice network 12 to a business exchange unit 20 in enterprise system 14. Business exchange unit 20 may preferably comprise an interactive voice response (IVR) unit associated with a PBX having a plurality of call destinations (not shown) in the form of a plurality of phone extensions associated with people within the enterprise. As used herein, enterprise means any business, governmental, institutional, educational, or other group dealing with the public and having a common phone system.

Carrier network 11 further includes a multimedia access gateway 18 for providing data connections between mobile handset 10 and data network 13, wherein the data connections can also be made to other remote data entities such as a directory manager 21 in enterprise system 14. Directory manager 21 is coupled to business exchange 20 and to a directory database 22. Directory manager 21 communicates with a push proxy gateway 19 in carrier network 11 to establish a data connection with mobile handset 10 as described in greater detail below. Directory database 22 is configured to provide the customized directory information to be transferred over the data connection to the mobile handset in appropriate circumstances. Configuration of the directory database may be performed by users for their individual records via a user access terminal 23 connected to data network 13. Thus, a business employee can connect their personal computer to directory manage 21 in order to remotely configure access rules in directory database 22 that determine what directory information, if any, will be sent to the calling party at particular times and under specific circumstances.

In operation, a call initiated from mobile handset 10 by dialing a telephone number associated with business exchange 20 is set up via MSC 17 and voice network 12. Business exchange 20 answers the call and provides an audio prompt including a choice to download a directory associated with the call destinations within the business enterprise. Provided that mobile handset 10 is preconfigured with a client application to perform the functions associated with retrieving and displaying the directory, the calling party selects the corresponding menu command thereby causing business exchange 20 to launch the directory process of the present invention.

The directory retrieval process is coordinated between directory manager 21 and mobile handset 10 as follows. Business exchange 20 informs directory manager 21 of the telephone number of the called party (e.g., obtained from a caller ID signal). Directory manager 21 then attempts to learn additional information about the caller as the basis for retrieving appropriate directory information. In order to obtain this user data, a data connection must be established between mobile handset 10 and directory manager 21. Therefore, push proxy gateway 19 is provided in carrier network 11 so that directory manager 21 can push its network address to mobile handset 10 which then opens a socket for a data session with directory manager 21. Once the data connection is established, user data that is preconfigured within the client application on handset 10 is transferred to directory manager 21 which applies access rules to determine appropriate directory information to be extracted from directory database 22. Then directory manager 21 sends the extracted directory information to handset 10 via the existing data connection. Alternatively, the data may be sent via a different route such as an SMS text message or email to handset 10. The directory data may be presented as comma delimited text which is fed into a graphical display on display 15 allowing the caller to review the directory information and to select a desired call destination based on the displayed names.

Example contents within directory database 22 are shown in FIG. 2 which is organized as a plurality of call destination records 25. Preferably, each record includes a directory name such as the name of a person (e.g., Tom, Harry, or Joe) or a function or department (e.g., accounting, service, or receptionist). Each record includes a destination identifier (such as a phone extension) for each call destination name. The records further include access rules that may be queried by the directory manager to determine relevant contact information that should be included in the data to be returned to any particular caller. The access rules may take the form of a scope or a filter, for example. A "scope" access rule may include a public scope wherein the associated call destination (with the name and destination identifier) is provided with every directory transfer to a caller (i.e., it is always relevant). Other scopes include records which may be restricted or hidden according to the application of various filters. Any particular scope may also include certain time blocks for which it is valid. In other words, a particular contact may be public at certain times and restricted at other times.

A "filter" access rule may include the location of the caller as determined from the user data obtained from the mobile handset. For example, the handset client application may monitor its location to determine a city where it is presently located. The access filter defines a relevant location as a city designated "x". If the cities match, then the record is relevant and the contact information of that person is included in the directory data sent to the client application. Another filter may be based on the actual identity of the caller as determined by the caller's phone number or from other information stored in the mobile handset. The filter defines the identities of callers who would be allowed to see the hidden contact. Such a "white list" of accepted callers to the hidden contact may also include time blocks during which the white list status is valid and other time blocks during which the contact will not be shown to the caller.

Figure 3:
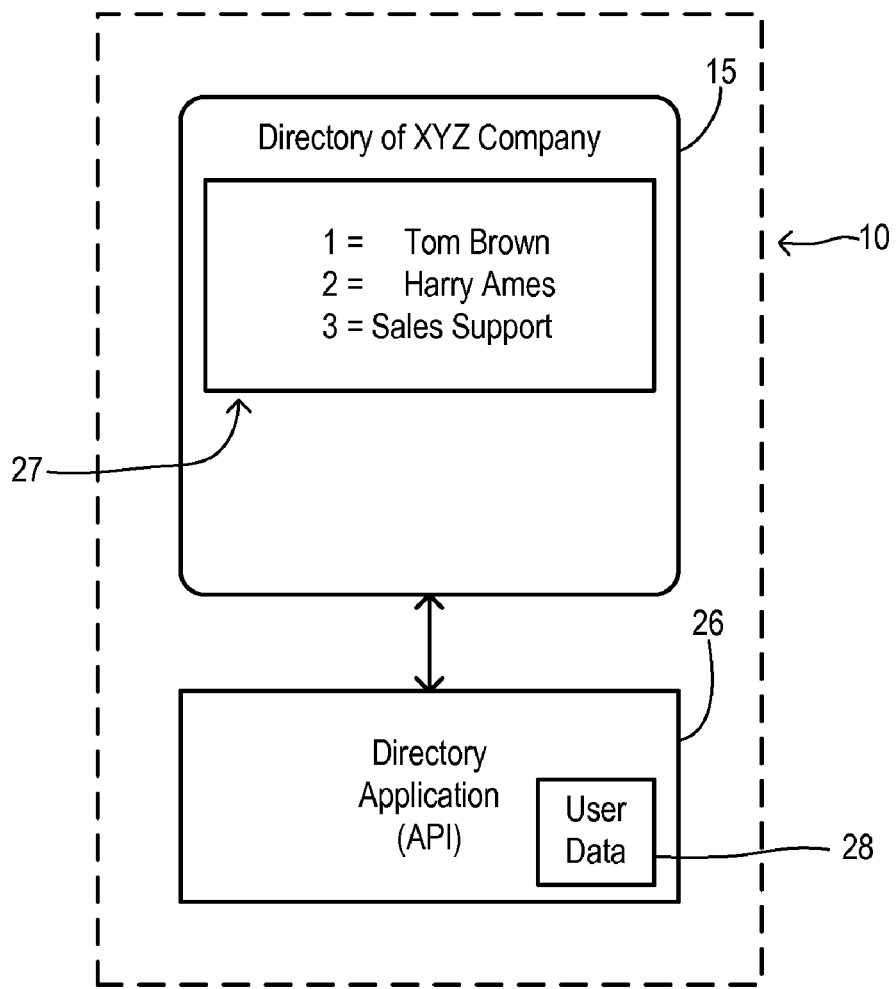
FIG. 3 illustrates the act of displaying a directory on a mobile handset.

Once relevant information is extracted from the directory database based on a query from the directory manager, it is returned to mobile handset 10 and displayed as shown in FIG. 3. The relevant directory information is transmitted to a directory application 26 such as an application program interface (API) which formats the name portion of the directory information and displays a directory selection menu 27 on display 15. For example, each name in the directory may be assigned to a respective key on the keypad so that the user may press a corresponding key, causing the directory application to capture the key press and send a corresponding destination identifier back to the directory manager so that the voice call to the business exchange can be redirected to the desired call destination. Alternatively, the destination identifier may be sufficiently complete to allow mobile handset 10 to establish a new call to the desired call destination. FIG. 3 also shows a memory 28 for storing the user data, which may include preconfigured data and real-time data that is determined by application 26 as needed.

Figure 4:
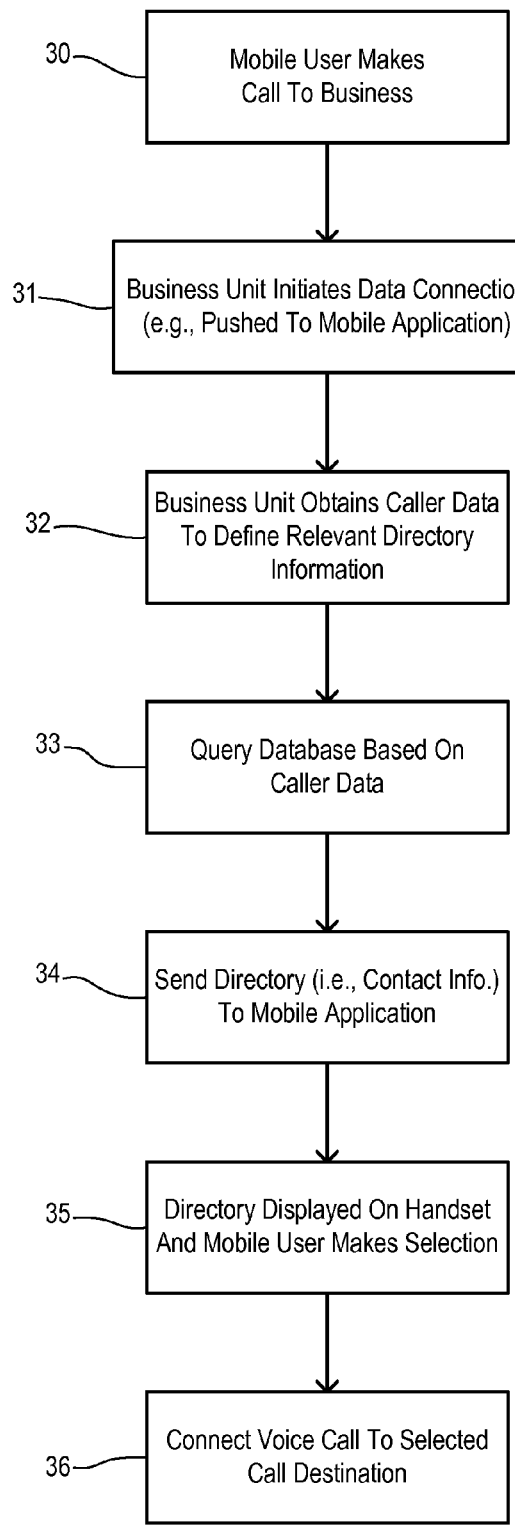
FIG. 4 is a flowchart of one preferred embodiment of a method of the present invention.

One preferred embodiment of a method of the present invention is shown in FIG. 4. The mobile user makes a call to a business or other enterprise in step 30. The business exchange or enterprise unit initiates a data connection in step 31, for example by pushing a message to the mobile handset application wherein the message includes a network address for the directory manager. In step 32, the enterprise unit is obtains the caller's user data (i.e., predetermined items of information of the type used to define relevant directory information according to the various access rules that may be employed). Based on the caller data, the directory manager queries the directory database in step 33. The relevant directory information resulting from the query is sent to the mobile application in step 34. In step 35, the directory information is displayed on the handset and the mobile user makes a selection. In step 36, a voice call is connected to the selected call destination, and the directory can be removed from the display on the mobile handset.

Figure 5:
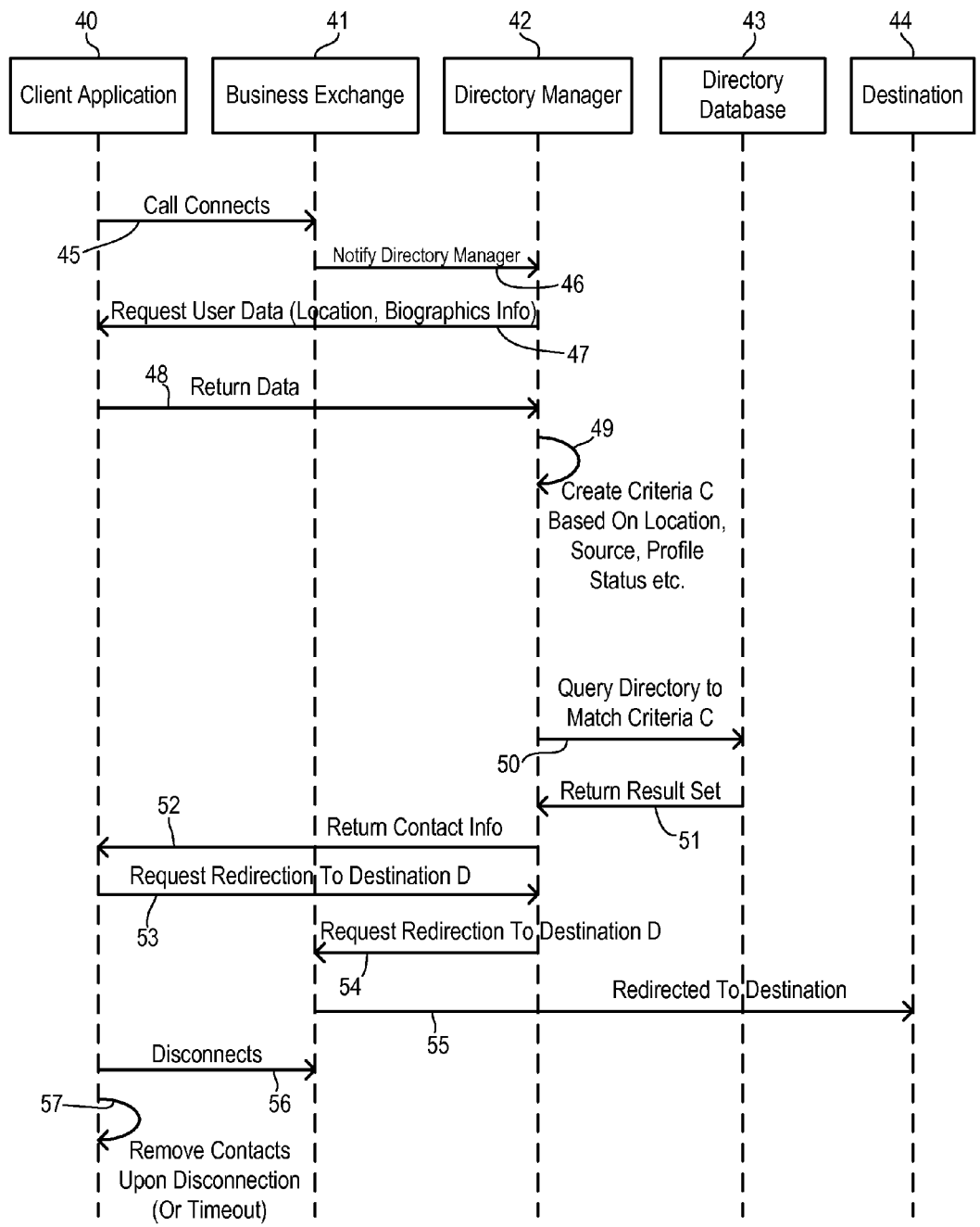
FIG. 5 is a signaling diagram showing a first preferred embodiment of the invention.

A more detailed signal flow for a first embodiment is shown in FIG. 5. Transactions occur between the separate entities of the client application 40, business exchange unit 41, directory manager 42, directory database 43, and call destination 44. In transaction 45, a call is connected between mobile client 40 and business exchange unit 41. The business exchange unit 41 notifies the directory manager of the call in transaction 46. In transaction 47, directory manager 42 requests user data (via the push proxy gateway), wherein the requested user data may include location and other biographic information. In transaction 48, client application 40 returns the user data to directory manager 42.

In transaction 49, directory manager 42 creates a criteria C based on the user data, wherein criteria C may identify the user location, the identity of the business exchange being service by the current process, a profile status of the caller, or other factors. In transaction 50, directory manager 42 queries directory database 43 in order to find relevant directory information matching criteria C. Based on criteria C, a result set is returned from directory database 43 to directory manager 42 in transaction 51. In transaction 52, the result set is returned to client application 40 as the relevant contact information for display as a directory on the mobile handset.

After reviewing the display directory, the caller indicates a selection for a call destination causing client application 40 to request redirection to a destination D in transaction 53. The redirection request is sent via the data connection to directory manager 42. Directory manager 42 then forwards the redirection request to business exchange unit 41 in transaction 54. The IVR unit within business exchange unit 41 redirects the voice call to destination 44 in transaction 55. At the conclusion of the call, the caller hangs up and a disconnect message is provided to business exchange unit 41 in transaction 56. Thereafter, the displayed directory of contacts is removed from the mobile handset in transaction 57. Alternatively, the directory may be removed after a time out, independently of the call termination.

Figure 6:
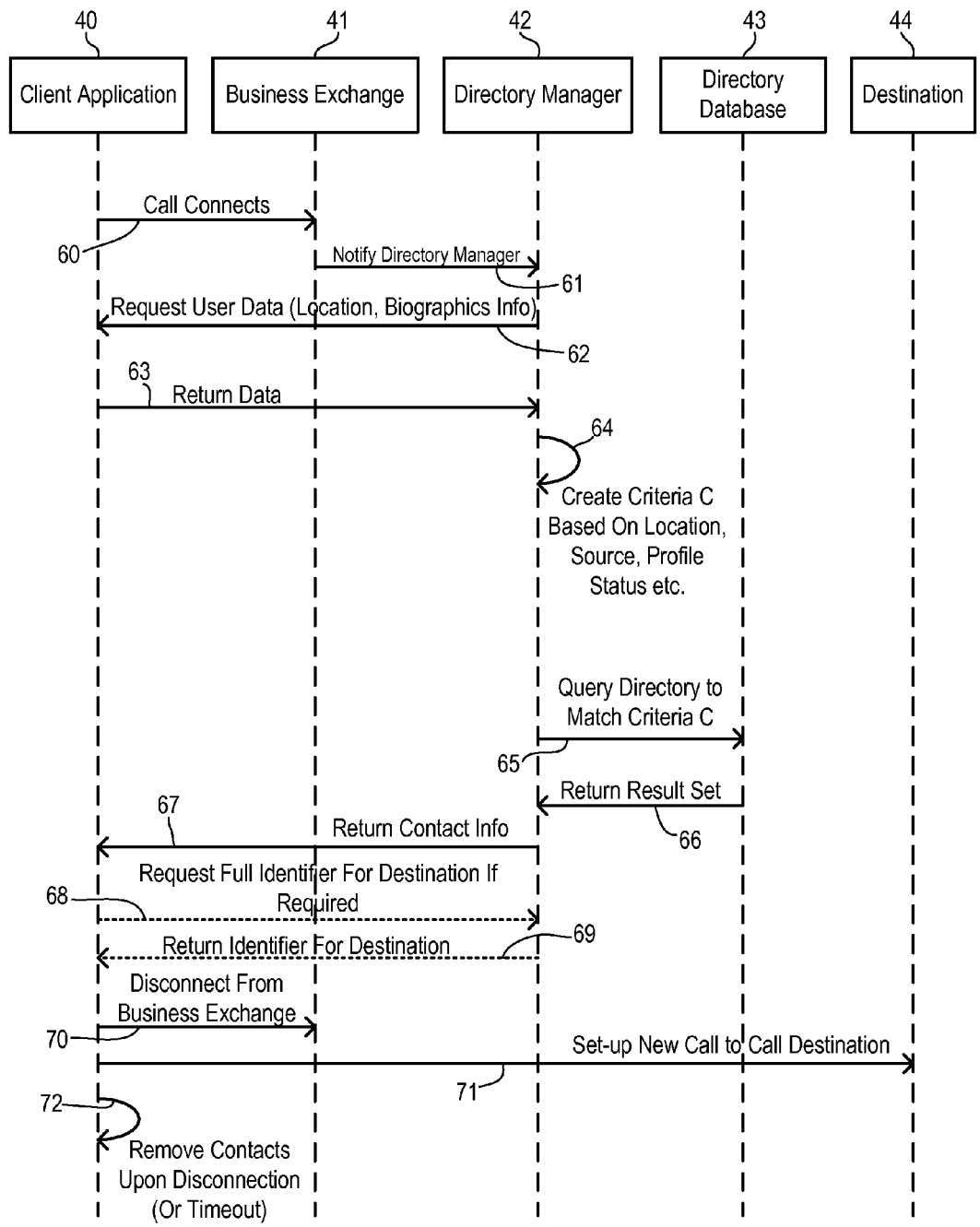
FIG. 6 is a signaling diagram showing a second preferred embodiment of the invention.

An alternative embodiment is shown in FIG. 6 wherein voice and data call set up and user data exchange are identical for transactions 60 through 67, resulting in the display of the directory information on the mobile handset. The method of FIG. 6 differs in that the business exchange unit is not employed to redirect the existing call. Instead, the mobile handset initiates a separate voice call to the desired destination. This embodiment allows contact information to be shown beyond the extensions of the local PBX.

More specifically, client application 40 may request a full identifier for the selected call destination in transaction 68 if it was not already sent as part of the directory data. The full identifier is returned from directory manager 42 to client application 40 in transaction 69. The mobile handset disconnects from business exchange 40 at transaction 70 and then a new call is set up to call destination 44 in transaction 71. Thereafter, the directory is removed from the mobile handset display in transaction 72 after call disconnection or a timeout.

What is claimed is:

1. A system for displaying directory information on a mobile handset of a user, comprising:
 a carrier network for carrying telecommunication calls to and from the mobile handset;
 an enterprise unit coupled to the carrier network and serving an enterprise having a plurality of call destinations;
 a directory database storing directory information for each call destination including a respective destination identifier and a respective access rule; and
 a directory manager coupled to the directory database and the enterprise unit, wherein the directory manager generates a request for user data in response to a call from the mobile handset to the enterprise unit;
 wherein the carrier network includes a push proxy gateway for forwarding the request from the directory manager to the mobile handset;
 wherein the mobile handset forwards the user data to the directory manager;
 wherein the directory manager evaluates at least one access rule in response to the user data to select relevant directory information from the directory database;
 wherein the directory manager forwards the relevant directory information to the mobile handset for display via the push proxy gateway as a packet-based message; and
 wherein the mobile handset selects a call destination based on the displayed directory information.

2. The system of claim 1 wherein the enterprise unit comprises an interactive voice response (IVR) unit, and wherein the call destinations are comprised of phone extensions of an enterprise.

3. The system of claim 2 wherein the IVR redirects the call from the mobile handset to the selected call destination.

4. The system of claim 1 wherein the directory manager provides call set-up information to the mobile handset corresponding to the selected call destination, and wherein the mobile handset ends the call to the enterprise unit and initiates a new call based on the set-up information.

5. The system of claim 1 wherein the call destinations are comprised of phone extensions of an enterprise, and wherein the destination identifiers for the call destinations include names of respective individuals of the enterprise.

6. The system of claim 1 wherein the call destinations are comprised of phone extensions of an enterprise, and wherein the destination identifiers for the call destinations include names of respective functional areas of the enterprise.

7. The system of claim 1 wherein the user data includes a location identifier, and wherein the respective access rules include at least one access rule comparing the location identifier with a predetermined location.

8. The system of claim 1 wherein the user data includes a person identifier, and wherein the respective access rules include at least one access rule comparing the person identifier with a list of predetermined identifiers.

9. The system of claim 1 wherein the user data is forwarded from the mobile handset to the directory manager via the push proxy gateway.

10. The system of claim 1 wherein the user data is forwarded from the mobile handset to the directory manager via a packet-based message.

11. A method of providing directory information for display on a mobile handset coupled to a carrier network, the method comprising the steps of:
 a user placing a call from the mobile handset via the carrier network to an enterprise unit, wherein the enterprise unit serves an enterprise having a plurality of call destinations;
 the enterprise unit notifying a directory manager of the call;
 the directory manager initiating a data connection with the mobile handset via a push proxy gateway whereby the directory manager requests caller data from the mobile handset;
 the mobile handset returning the caller data to the directory manager;
 the directory manager querying a directory database using at least a portion of the caller data, wherein the directory database stores directory information for each call destination including a respective destination identifier and a respective access rule, and wherein the query includes comparing the caller data to at least one access rule contained in the directory database to select relevant directory information relating to the call destinations;

forwarding the relevant directory information to the mobile handset via the push proxy gateway as a packet-based message;

displaying the relevant directory information to the user of the mobile handset; and the user selecting a call destination in response to the relevant directory information being displayed.

12. The method of claim 11 further comprising the step of redirecting the call to the selected call destination.

13. The method of claim 11 wherein the relevant directory information includes a destination address for the selected call destination, and wherein the method further comprises the steps of:

terminating the call to the enterprise unit; and initiating a new call from the mobile handset to the selected call destination using the respective destination address.

14. The method of claim 11 wherein the call destinations are comprised of phone extensions of an enterprise, and wherein at least some destination identifiers include names of respective individuals of the enterprise.

15. The method of claim 11 wherein the call destinations are comprised of phone extensions of an enterprise, and wherein at least some destination identifiers include names of respective functional areas of the enterprise.

16. The method of claim 11 wherein the user data includes a location identifier, and wherein the access rules include at least one access rule for comparing the location identifier with a predetermined location.

17. The method of claim 11 wherein the user data includes a person identifier, and wherein the respective access rules include at least one access rule comparing the person identifier with a list of predetermined identifiers.

18. A mobile handset operative with a carrier network for displaying directory information of a called enterprise, wherein the called enterprise has an enterprise unit coupled to the carrier network and serving a plurality of call destinations within the enterprise, a directory database storing directory information for each call destination including a respective access rule, and a directory manager coupled to the directory database and the enterprise unit, wherein the directory manager generates a request for user data in response to a call from the mobile handset to the enterprise unit and forwards the request to the mobile handset via a push proxy gateway, the mobile handset comprising:

a display for displaying the directory information to a user;

a client application responsive to a data connection initiated from the carrier network to the mobile handset containing the request for user data by sending predetermined user data to the directory manager, the client application further responsive to relevant directory information received from the directory manager as a packet-based message via the push proxy gateway for presenting the relevant directory information on the display; and a manual input element for being manually actuated by the user to select a call destination identified in the relevant directory information being displayed.

19. The mobile handset of claim 18 wherein the client application responds to selection of the call destination by sending a request for a redirection of the call with the enterprise unit.

20. The mobile handset of claim 18 wherein the client application responds to selection of the call destination by terminating the call with the enterprise unit and initiating a new call based on the relevant directory information.

21. The mobile handset of claim 18 wherein the relevant directory information is deleted from the client application after the selection.

* * * * *